Feb. 5, 1957 W. E. McKIM 2,780,024
RODENT TRAPS
Filed Aug. 31, 1954
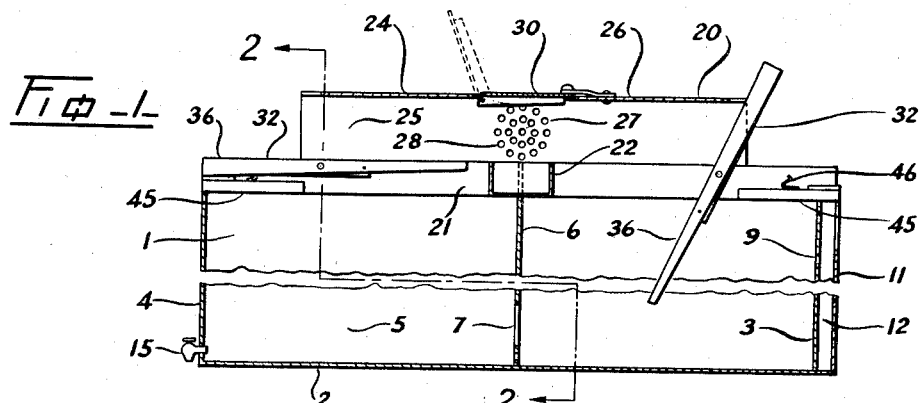
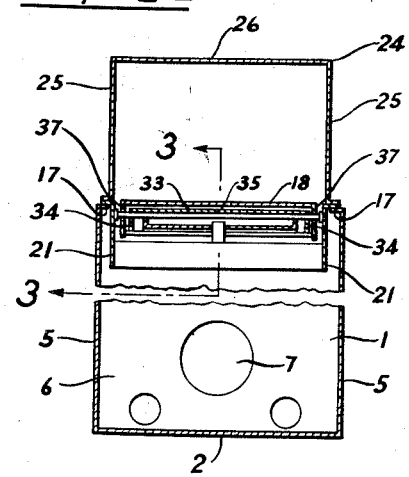
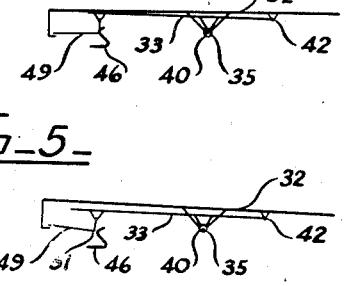
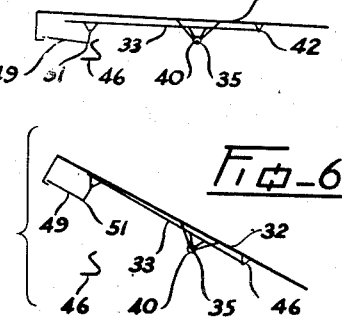
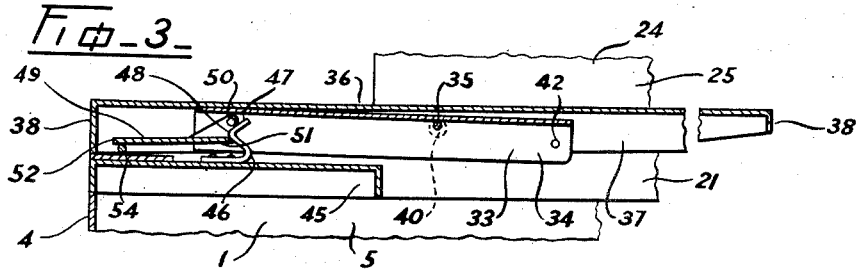
INVENTOR.
WALTER E. McKIM
ATTORNEY

United States Patent Office 2,780,024
Patented Feb. 5, 1957

2,780,024

RODENT TRAPS

Walter E. McKim, Vancouver, British Columbia, Canada

Application August 31, 1954, Serial No. 453,365

1 Claim. (Cl. 43—70)

My invention relates to improvements in rodent traps.

The objects of the present invention are to provide a rodent trap having a runway which is rockingly mounted above a water filled container and along which the animal must proceed in an attempt to reach the bait; to provide means for holding the runway in normally horizontal position until such time that the rodent is well beyond the axis of the runway, and to provide means actuated by the weight of the rodent upon the extreme inner end of the runway for releasing said runway to drop the animal into the container.

A further object of the invention is to provide a trap which is automatically reset by the return swing of the runway.

Referring to the accompanying drawings:

Figure is a longitudinal sectional view of the invention with certain parts shown in elevation.

Figure 2 is an enlarged transverse sectional view taken on the line 2—2 of Figure 1.

Figure 3 is a detail sectional view taken on the line 3—3 of Figure 2 and showing the latching mechanism.

Figures 4, 5 and 6 are diagrammatic views showing the movements of the runway to release the latch and tilt to discharge.

In the drawings like characters of reference indicate corresponding parts in each figure.

The numeral 1 indicates a container having a bottom wall 2, end walls 3 and 4, side walls 5 and a centrally disposed transverse baffle 6 which is preferably apertured as at 7, see particularly Figure 2. The container is adapted to be filled with water to a depth determined by an overflow aperture 9 in the end wall 3 and said aperture is substantially aligned with the top edge of an end plate 11 which defines with the side walls 5 and said end wall an overflow chamber 12. A drain cock 15 is fitted to the end wall 4. The side walls 5 of the container are provided with inwardly directed flanges 17 which serve to removably support a trap generally indicated by the numeral 18.

The trap 18 is provided with a frame 20 consisting of spaced longitudinal frame members 21 which are connected by a centrally disposed bait box 22 and surmounting said bait box is an elongated hood or tunnel 24 which extends over a major portion of the length of the trap and is provided with side walls 25 and a top wall 26. Adjacent the bait box the side walls 25 are apertured as at 28 and the top wall 26 is fitted with a door 30 through which bait may be supplied to the bait box. The opposite ends of the longitudinal frame members 21 are each provided with a runway structure generally indicated by the numeral 32 and consisting of a plate member 33 having depending side flanges 34 through which a pivot rod 35 extends. The pivot rod is offset from the centre of gravity of the member 33 or to the right thereof as viewed in Figure 3 and said rod is journalled in the frame members 21. Surmounting the plate member is a runway 36 having depending side and end flanges 37 and 38 respectively. The pivot rod extends through openings 40 formed in the side flanges 37 which openings are of slightly greater diameter than said pivot rod, so that the runway has slight vertical movement with respect to the rod and to the plate member 33. At a point to the right of the pivot rod 35, see Figure 3, the respective side flanges 34 and 37 of the plate member and runway are connected by a pivot pin 42 which is disposed to space the inner end of the plate member a short distance below the underside of the runway. By virtue of the disposition of the pivot pins 42 and the enlarged openings 40 the runway has limited rocking movement about said pins and with respect to the plate member 33.

The runway 36 is normally supported in horizontal position by means of a platform 45 which extends between the frame members 21 and is fitted with a centrally disposed substantially S-shaped latch 46 having a cam face 47 and an outwardly projecting stop 48. The latch is adapted to be engaged by a latch plate 49 which is rockingly mounted between the side flanges 34 of the plate member 33 by means of hinge pins 50. The inner or latch engaging edge 51 of the latch plate is disposed a short distance to the left of the hinge pins as viewed in Figure 3 and the outer or free end 52 of said plate is normally supported upon a rod 54 which extends between the side flanges 37 of the runway.

In use, the device operates as shown diagrammatically in Figures 4, 5 and 6 and in the following manner. A rodent senses the bait in the bait box 22 and proceeds along the runway 36 which remains in a horizontal position until the rodent reaches the inner end of said runway. At this point his weight is well beyond the pivot rod 35 and is sufficiently far beyond the pins 42 as to cause the runway to rock very slightly about said pins until the lower edge of the openings 40 contact the pivot rod 35. This initial rocking movement of the runway swings the latch plate 49 in a clockwise direction, see Figure 4. Subsequent movement causes the plate member 33 to fulcrum upon the pivot rod 35, as in Figure 5, and causes said plate member to move slightly to the left while lifting the inner end of the latch plate so that its edge 51 disengages the latch 46 and allows the runway 36 and the plate member 33 to swing as a unit about the pivot rod 35 as shown in Figure 6 and to the right of Figure 1. The rodent slides from the runway into the water and the runway structure starts its return swing to its original horizontal position. The initial swing of the runway is so slight and the subsequent swing of the completely overbalanced runway so rapid that the rodent receives practically no warning of impending danger and has no opportunity to scramble to safety. As the outer end of the runway is about to contact the platform at the completion of its return swing the inner edge 51 of the latch plate strikes the cam face 47 of the latch and is rocked thereby, so as to clear the stop 48. The outer end 52 of the latch plate drops onto the rod 54 and the inner edge 51 is moved into engagement with the stop, so that the runway is again latched and ready for the next rodent.

What I claim as my invention is:

A rodent trap comprising a horizontal frame having a transverse pivot rod intermediate its length, a normally horizontal runway having a free end adapted to be depressed in response to the weight of a rodent, said runway loosely engaging said pivot rod to rock about, a plate member pivotally mounted upon the pivot rod and having one end pivotally engaging the runway between the pivot rod and the free end of said runway, said frame having a platform for supporting an end of the runway when said runway is in horizontal position, a latch carried by the platform, a latch plate hingedly connected to an end of the plate member and adapted to engage the latch to hold the plate member and said runway in substantially horizontal position, said latch plate being subject to swinging movement to disengage said latch when the free end of the runway is depressed by a rodent thereon whereby said runway is freed to rock about said pivot rod to effect trapping of the rodent.

References Cited in the file of this patent

UNITED STATES PATENTS

| | | |
|---|---|---|
| 947,250 | Merchand | Jan. 25, 1910 |
| 1,204,472 | Mills | Nov. 14, 1916 |
| 1,227,395 | Curtis | May 22, 1917 |
| 1,618,636 | Bonchina | Feb. 22, 1927 |
| 1,802,253 | Hein et al. | Apr. 21, 1931 |
| 1,810,608 | Jacobs | June 16, 1931 |
| 2,564,134 | Streed | Aug. 14, 1951 |